United States Patent

[11] 3,625,185

[72] Inventor Arthur S. Kester
Chicago, Ill.
[21] Appl. No. 41,196
[22] Filed May 28, 1970
[45] Patented Dec. 7, 1971
[73] Assignee Rauland-Borg Corporation
Chicago, Ill.

[54] ADJUSTABLE DEVICE FOR LIMITING THE MOVEMENT OF LABORATORY ANIMALS
6 Claims, 12 Drawing Figs.

[52] U.S. Cl. .................................................. 119/98,
119/96, 119/103
[51] Int. Cl. ...................................................... A61d 3/00
[50] Field of Search .......................................... 119/96,
103, 98, 99; 17/1

[56] References Cited
UNITED STATES PATENTS

| | | | |
|---|---|---|---|
| 3,094,101 | 6/1963 | Porter ............................ | 119/96 X |
| 3,103,204 | 9/1963 | Greene ........................... | 119/103 |
| 3,187,721 | 6/1965 | Cappel ........................... | 119/103 |
| 3,474,763 | 10/1969 | Kissil et al. .................... | 119/96 |

Primary Examiner—Aldrich F. Medbery
Attorney—Lloyd J. Andres

ABSTRACT: An adjustable device for retaining and limiting the movement of each of a number of small laboratory animals of different size by confinement in a cylindrical cage of adjustable diameter having a gate means providing a closure for one end thereof and a variable closure for the opposite end of the cage, for adjustment of the distance to the gate. The adjustment of the diameter of the cylinder in close proximity to the animal prevents the animal from turning, and the adjustment of the internal distance limits the longitudinal movement of the animal.

PATENTED DEC 7 1971 3,625,185

INVENTOR.
ARTHUR S. KESTER
BY
Lloyd J Andres

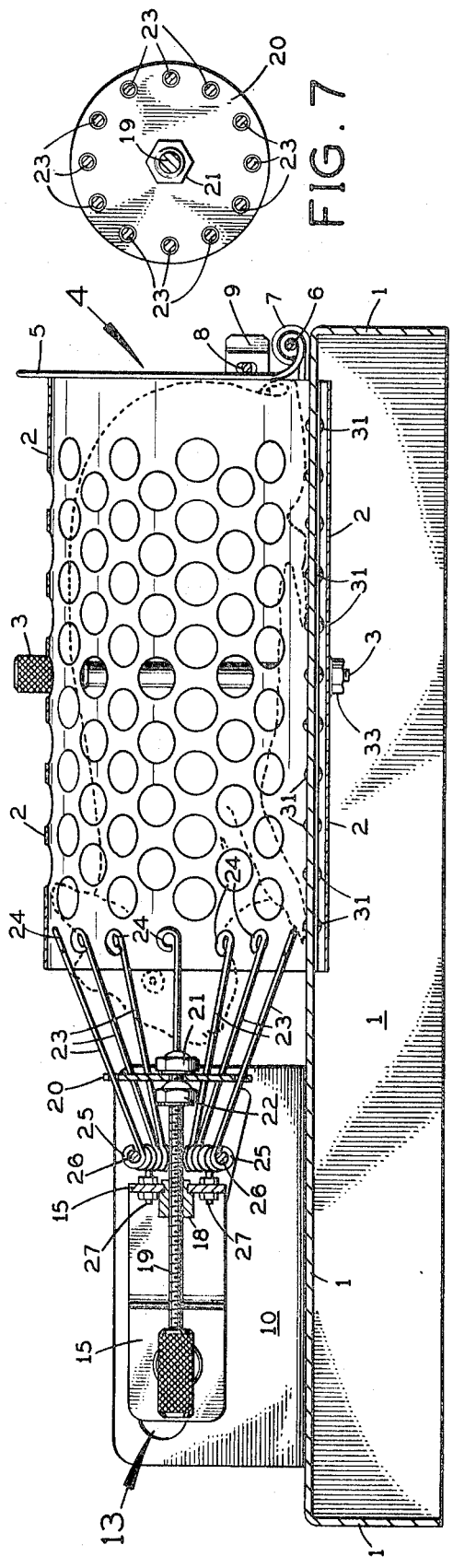
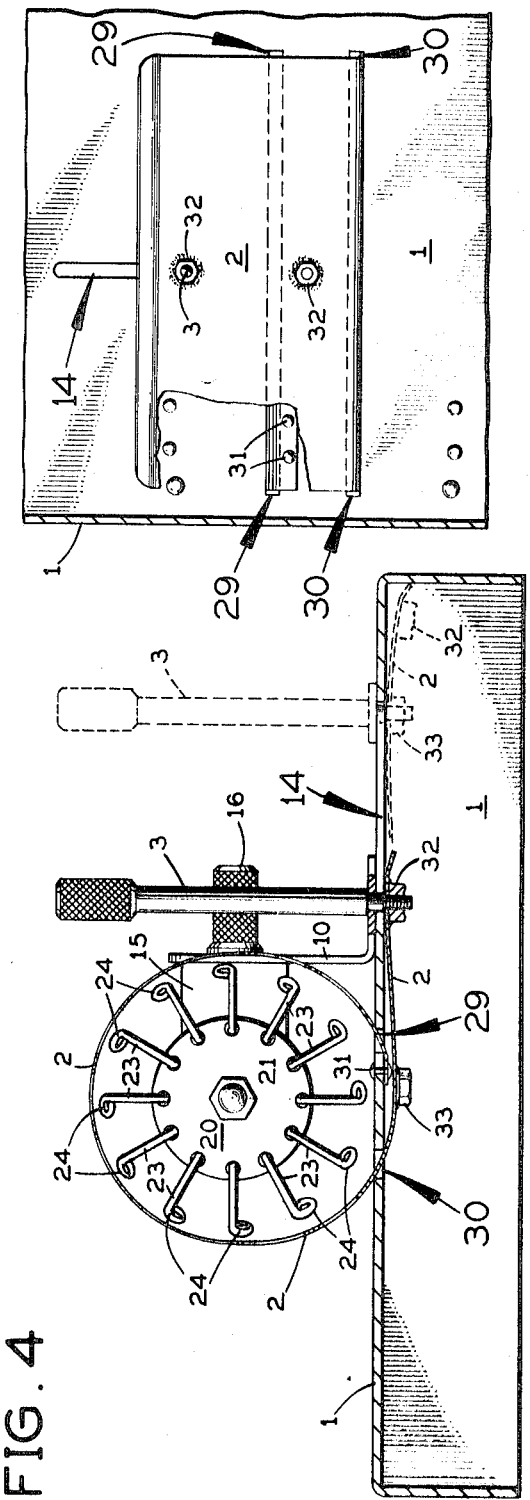

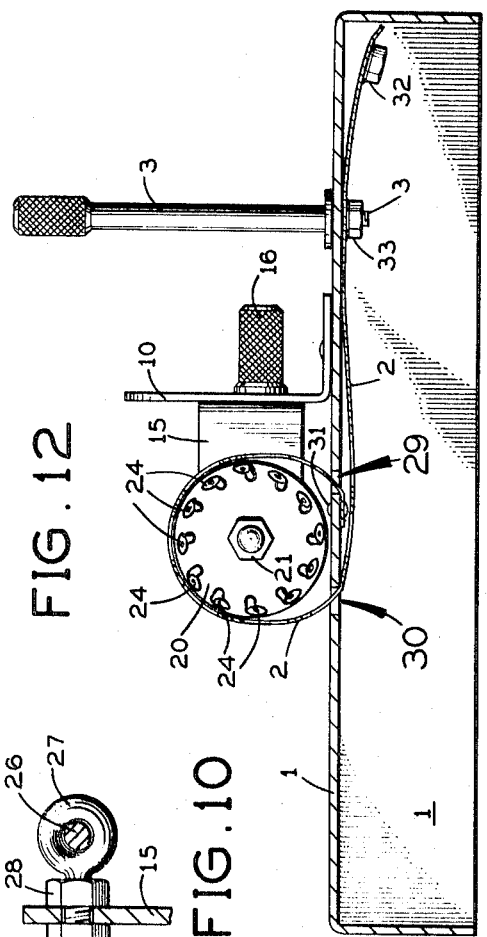
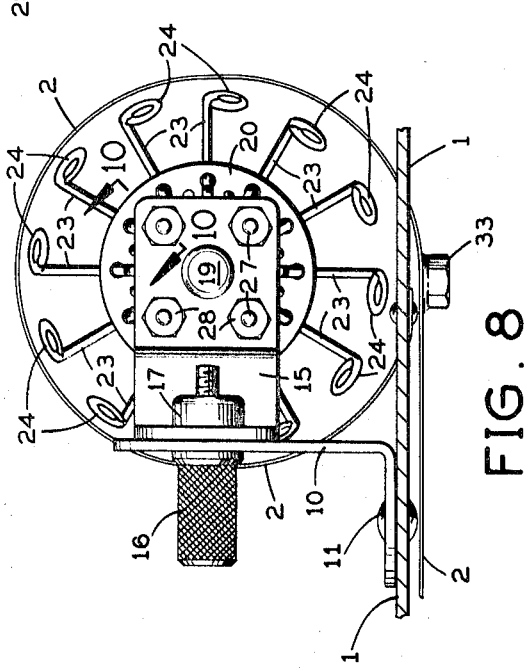
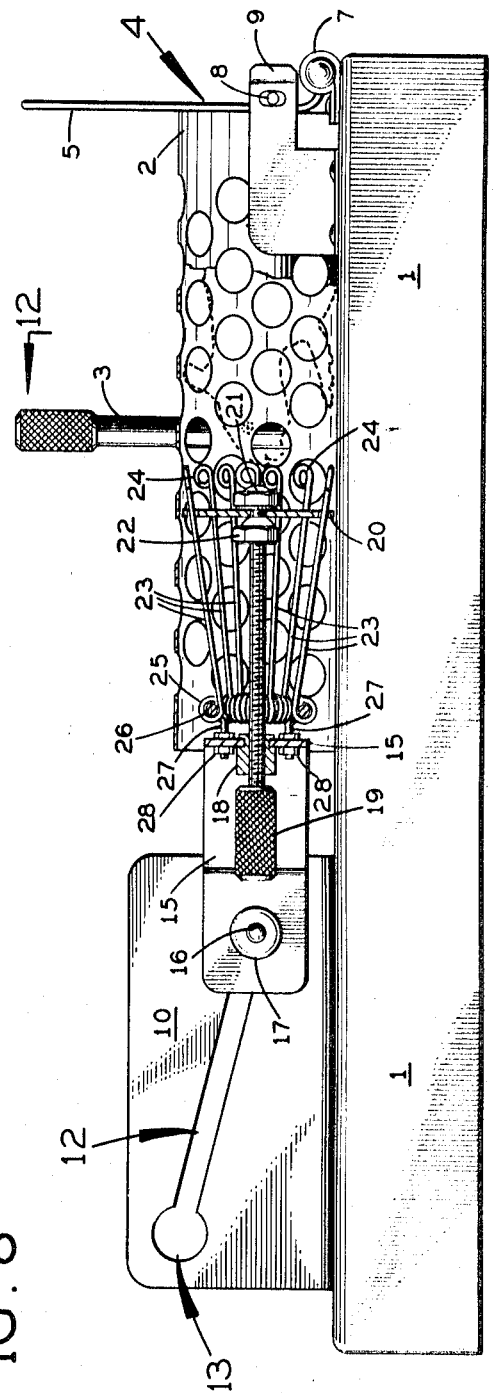
INVENTOR.
ARTHUR S. KESTER

ADJUSTABLE DEVICE FOR LIMITING THE MOVEMENT OF LABORATORY ANIMALS

This invention relates in general to apparatus related to laboratory animals used for experimental medical purposes and more particularly to an adjustable device for confining each of a variety of animals of different size within predetermined small limits of movement.

Prior to this invention, cages of wide variety of sizes and shapes were used for confining and limiting the movement of laboratory animals, which required selection for a particular size of cage for the animal under test and involved a waste of a technician's time and loss of useful space.

The present invention overcomes the above objections and disadvantages by the provision of a perforated restraining cage for animals in which the diameter and length may be quickly adjusted to limit the range of lateral and linear movement of an animal of particular size, which construction is a principal object of the invention.

A further object of the invention is the provision of a cylindrical cage with a radially adjustable diameter with respect to the axis thereof within predetermined limits corresponding to the width of the animal retained therein.

Another object of the invention is the provision of a manually operable gate providing a closure for one end of the aforesaid cylinder and a barrier for the opposite end of the cylinder adjustable to a diameter and distance from the gate for adjusting to correspond to the length of the confined animal.

These and other objects and advantages in one embodiment of the invention are described and shown in the following specification and drawings, in which:

FIG. 4 is an enlarged cross-sectional side view taken through section line 4—4, FIG. 3.

FIG. 5 is an enlarged cross-sectional end elevation taken through section line 5—5, FIG. 2.

FIG. 6 is a fragmentary bottom plan view taken through section line 6—6, FIG. 1.

FIG. 7 is a cross-sectional end elevation taken through section line 7—7, FIG. 2.

FIG. 8 is a fragmentary enlarged cross-sectional end view taken through section line 8—8, FIG. 2.

FIG. 10 is an enlarged fragmentary view taken through section line 10—10, FIG. 8.

FIG. 11 is a left-hand enlarged view of the device shown in FIG. 1.

FIG. 12 is a cross-sectional end elevation taken through section line 12—12, FIG. 11.

Figure 1:
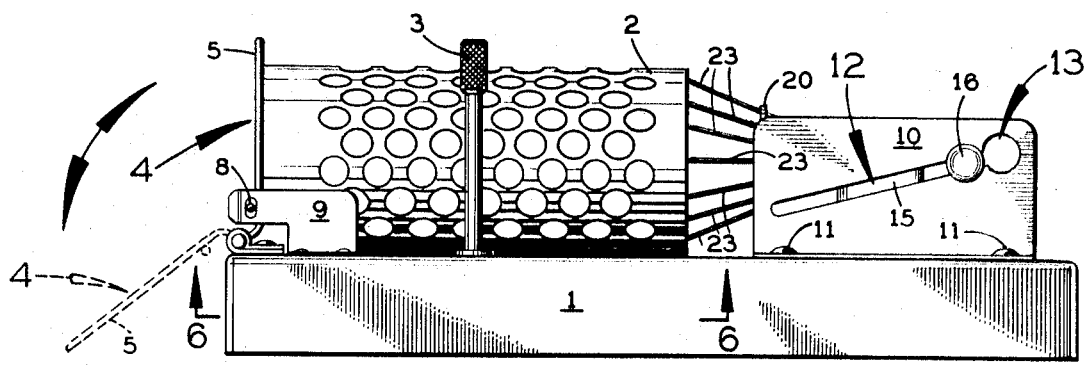
FIG. 1 is a right side elevation of the device in reduced scale.

Referring to FIGS. 1-4, a rectangular chassis having a planar top side of uniform thickness provides a base 1 for the apparatus on which is mounted a substantially cylindrical cage 2 having a plurality of perforations therethrough and an adjustable diameter controlled by an elongated knurled screw 3, to be hereinafter described.

The left open end of the cage 2 is provided with a gate closure assembly 4 for the insertion and removal of the animals. The gate consists of a plurality of formed rods or bars 5. A transverse bar 6 secured to the lower ends of bars 5 has the outer ends thereof journaled for rotation in bearings 7—7 riveted to base 1. A second transverse bar 8 is secured to bars 5, as shown, the ends of which are adapted to engage formed spring blades 9—9 riveted to base 1 for latching the gate assembly 4 in its closed position, as shown in full lines.

Figure 2:
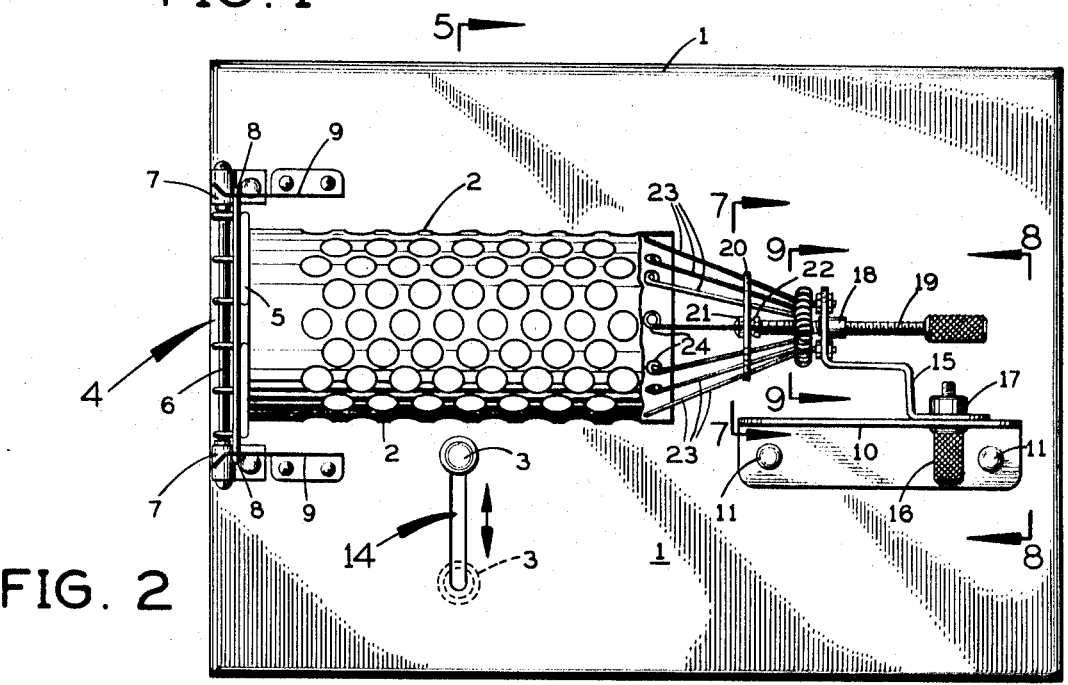
FIG. 2 is a top plan view of the device shown in FIG. 1.
Figures 3, 9:
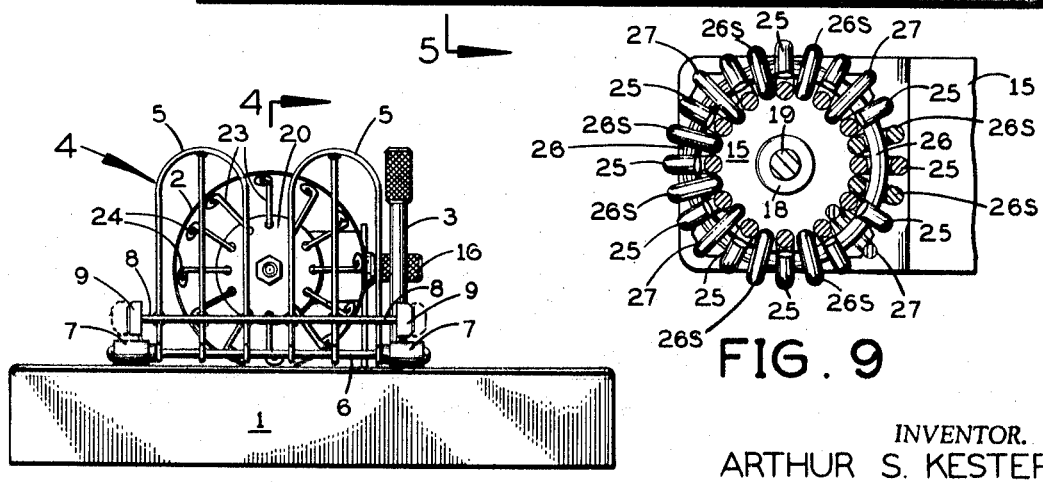
FIG. 3 is a left end elevation of the device shown in FIG. 2.
FIG. 9 is an enlarged fragmentary cross-sectional end view taken through section line 9—9, FIG. 2.

FIGS. 1 and 2 show a right angle barrier bracket 10 secured to base 1 by rivets 11—11, which has an oblique slot 12 therein terminating in a circular aperture 13 at the upper end thereof, for adjustably retaining a barrier assembly, to be hereinafter described.

FIG. 2 shows a slot 14 transverse the axis of cage 2 in which the screw 3 may be adjustably secured. FIG. 2 also shows a stepped bracket 15 adjustably secured to bracket 10 by a knurled screw 16, which is threaded into a bushing 17 secured to bracket 15. Bracket 15 has secured thereto to a second bushing 18 through which is threaded a third relatively long knurled screw 19 substantially coaxial with the axis of cage 2. A circular barrier disc 20 is loosely retained on the end of screw 19 by a head 21 and a nut 22 spaced therefrom. The disc supports and guides a plurality of barrier rods 23, which rods terminate at their inner ends in barrier eyes 24, as shown.

Referring to FIG. 4, the outer ends of each of the rods 23 terminate in eyes 25, which are formed for movement on a ring 26 and separated by spacers 26s. The ring is supported, as shown, by four screw eyes 27, which eyes are secured to the outer transverse portion of bracket 15 by screw nuts 27 shown in FIG. 10.

It is now apparent that the direction of rotation of screw 19 will expand or contract the barrier rod 23 in an expanding or contracting cone by the axial movement of disc 20 to correspond with the diameter of the cage and the adjustment of screw 16 will maintain the screw 19 in substantially coaxial relation with the cage 2.

Referring to FIGS. 2 and 6, cylinder is mounted to base 1 through a pair of spaced slots 29 and 30 parallel with the axis of the cage and slightly longer than the width thereof.

The foraminated cylinder is formed from relatively thin spring type sheet metal, such as phosphor-bronze, with a longitudinal slot defining two side edges one edge thereof secured through slot 29 to the base 1 by rivets 31 and the surface of the cylinder manually formed into a cylindrical loop with the other edge portion thereof extending through slot 30 along the under side of the base 1. A pair of nuts 32 and 33 are soldered in spaced relation to the under side portion of the cage surface of the cylinder 2 under the base 1 and central thereof, as shown in FIG. 5. Thus when the screw 3 is in the near position to the cage 2, and engaging nut 32, then the cage will have assumed its largest diameter. When the screw 3 is progressively moved in slot 14 to its outer position with respect to the cage, shown in dotted lines in FIG. 5, and in engagement with nut 32, then the cylindrical cage will be progressively reduced in diameter. The second nut 33 is provided to receive the knurled screw 3 when a similar diameter cage adjustment is desired.

FIG. 7 illustrates the working relationship between the screw 19, the disc 20, and the stop nut 22 and the rods 23.

Referring to FIG. 12, when a smaller diameter cage is desired, the screw 3 is removed from nut 32 and the under portion of the cage withdrawn through the slot 30 and the screw 3 engaged in nut 33. Thus the cage can be progressively reduced in diameter by moving the screw progressively along slot 14 and tightening same when the cage is reduced to the selected diameter. Concurrently with the change in size of the cage 2, it is usually desirable to limit the effective length of the cage by two remaining adjustments: first, by reducing the circular positioning of the eyes 24 of the rods 23 by rotation of screw 19 to move the disc 20 inward sufficiently far to place the barrier disc 20 and the barrier eyes 24 to a desired position. Any material change in the diameter of the cage must be accompanied by the longitudinal movement of the bracket 15 in the sloping slot 12, thus centering the barrier means in proper linear and radial position with respect to the gate assembly 4 and the diameter of cage 2. The circular opening in the upper end of the slot 15 permits the entire barrier assembly to be easily removed for cleaning or adjustment. It is now apparent from FIGS. 4 and 11 that animals of a considerable range of size may be conveniently retained in a preadjusted cage diameter and the longitudinal barrier preadjusted to accommodate a wide range of animal size, which animals are restrained from movement in excess of predetermined limits.

The dotted animal figures in FIG. 4 and 11 illustrate the range of adjustment of the device to restrain animals of different size by the manual adjustment of the knurled screws 3, 16 and 19.

This invention comprehends modifications in construction within the teachings and scope of the above specification.

Having described my invention, I claim:

1. A device for restraining the movement of laboratory animals comprising means forming a base having a top side of uniform thickness, a cylinder having open ends and a longitudinal slot defining two side edges and formed from flexible perforated material secured to said top side of said base including manual adjustment means cooperatively related with said cylinder edges and said top side of said base for moving the edges toward and away from each other for adjusting the diameter of said cylinder within predetermined limits, a gate means pivotally secured on said top side of said base for movement from an open to a closed position against one open end of said cylinder, a barrier mounting means secured on and extending upward from said top side of said base, an adjustable barrier assembly secured to said mounting means and positioned in the opposite end of said cylinder including manual sloping adjustment means related to said mounting means for maintaining said assembly coaxial with the axis of said cylinder when the assembly is adjusted to a predetermined distance from said gate means whereby an animal of predetermined size positioned in said cylinder will be limited to predetermined lateral and longitudinal movement with respect to the said axis.

2. The construction recited in claim 1 wherein the said barrier assembly comprises a plurality of rods retained in spaced conical form within said cylinder coaxial with the axis thereof by a support disc and each of said rods pivotally retained at one end on a bracket normal said axis and adjustably secured to said barrier mounting means, each of said rods terminating at its inner end in an eye positioned in close proximity with the inner periphery of said cylinder, screw means in said bracket for longitudinally moving said disc for adjusting the peripheral diameter of said eyes with respect to the inner periphery of said cylinder whereby said barrier assembly may be adjusted to conform to the inner periphery of said cylinder within said predetermined limits.

3. The construction recited in claim 1 including manually operable latch means secured to said top side of said base and cooperatively related to said gate means for holding same in said closed position.

4. In a device for restraining animals of the character described a means forming a base having a top side of uniform thickness, a pair of parallel slots of predetermined width and length through said tip side in close parallel spaced relation, a linear sheet of flexible perforated material of uniform width and predetermined length having one end thereof extending through one of said slots and a margin thereof secured to the under side of said top side adjacent one of said slots, the opposite end portion of said sheet of material extending through the said other slot and adjustably secured to the under side of said top side by an adjustable screw means extending through a slot in said top side normal said parallel slots for forming the sheet into an expandable and contractable cylindrical cage having open ends on the upper side of said top side having a predetermined selected diameter dependent upon the position of said screw in said slot, gate means pivotally secured to said top side for movement from a normal open to a closed position against one said open side of said cage, an adjustable barrier means secured to bracket means secured to said top side and adjustably positioned in said cage from the side opposite said gate and with respect to the axis thereof for providing selective distances from said gate means to said barrier means for limiting the movement of an animal retained in said cylinder between said gate means and said barrier means.

5. The construction recited in claim 4 including a barrier mount secured to said top side of said base and upright thereof and parallel and displaced a predetermined distance from the axis of said cage, said upright having an oblique slot therein at a predetermined angle with reference to said top side, a barrier means of adjustable diameter positioned for axial movement in said cage, a bracket means connecting said barrier means and retained to said mount by a lock screw through said slot whereby said barrier means may be adjusted in coaxial position in said cage when said barrier means is moved longitudinally therein by the vertical positioning and tightening of said lock screw in said slot.

6. The construction recited in claim 4 including an adjustable barrier having a plurality of rods of like diameter and predetermined length slidably positioned in equispaced relation through holes around the peripheral margin of a circular disc, said rods terminating at the inner ends thereof movably around a ring in the form of a cone with said ring secured on said bracket means normal to and coaxial to the said axis, a barrier adjust screw means centrally threaded through said bracket means with the outer end thereof journaled for rotation central of said disc with the outer ends of said rods in close proximity to the inner periphery of said cage whereby the diameter of the periphery of said ends may be adjusted according to the diameter of said cage by the rotation of said barrier adjust screw means.

* * * * *